United States Patent
Windrem et al.

(10) Patent No.: US 6,452,643 B1
(45) Date of Patent: *Sep. 17, 2002

(54) LINKING KEYERS TO BACKGROUND SOURCE SELECTIONS

(75) Inventors: Kevin D. Windrem, Grass Valley, CA (US); Robert A. Ennis Jr., Nevada City, CA (US); Michael Krim, Waltham, MA (US)

(73) Assignee: Grass Valley (US), Inc., Nevada City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,674

(22) Filed: Sep. 8, 1999

(51) Int. Cl.[7] .............................. H04N 9/74; H04N 5/268

(52) U.S. Cl. ........................ 348/585; 348/705; 348/591

(58) Field of Search .................................. 348/578, 585, 348/586, 587, 590, 591, 593, 594, 705; H04N 9/74, 5/268

(56) References Cited

U.S. PATENT DOCUMENTS 6,281,941 B1 * 8/2001 Windrem ..................... 348/585

* cited by examiner

Primary Examiner—Sherrie Hsia
(74) Attorney, Agent, or Firm—Smith-Hill and Bedell

(57) ABSTRACT

Linking keyers to background source selections is achieved by defining a key link association table between background sources and keyers for an M/E of a production switcher. Key Add and Key Drop modifiers are provided so that the effects of the key link association table may be modified while making a background source change.

1 Claim, 1 Drawing Sheet

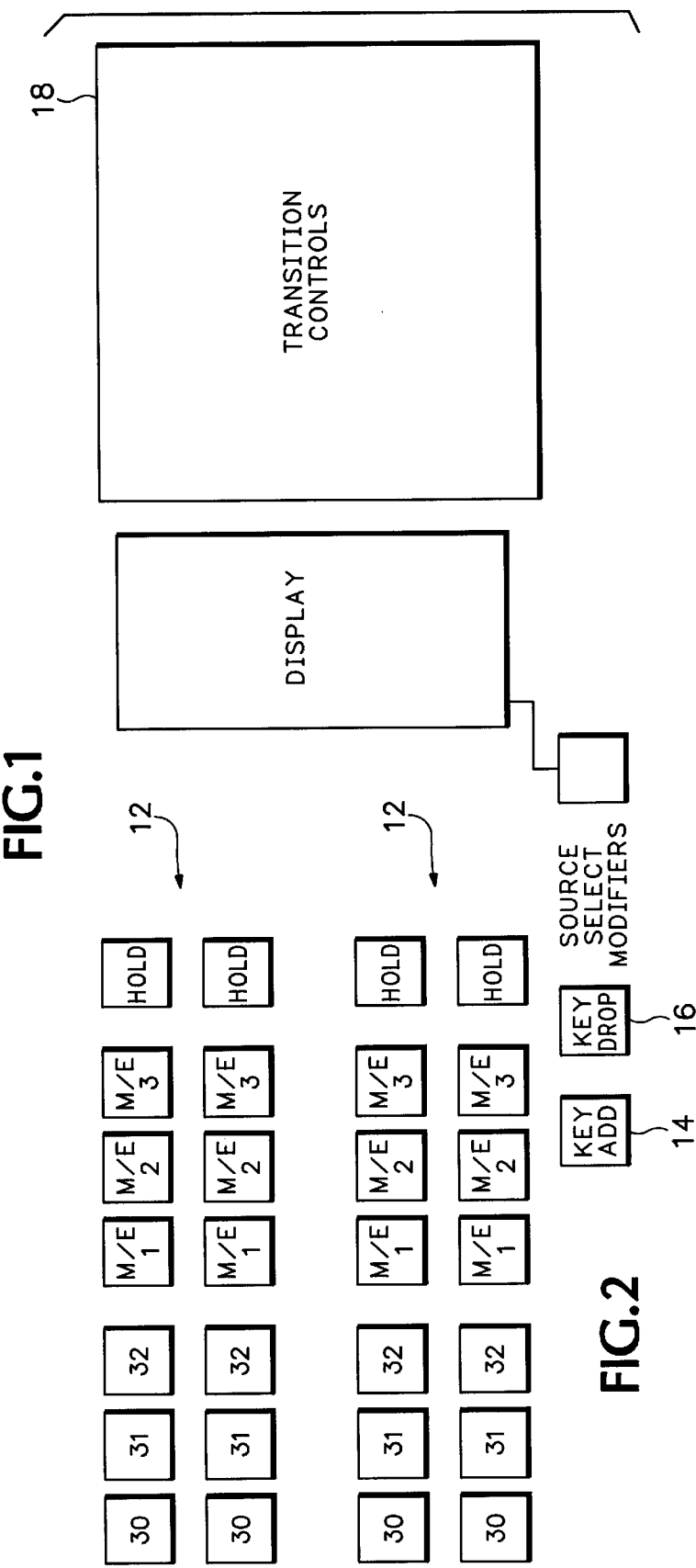

LINKING KEYERS TO BACKGROUND SOURCE SELECTIONS

BACKGROUND OF THE INVENTION

The present invention relates to video signal processing, and more particularly to linking keyers in a digital video switcher to background source selections.

In an effort to add impact to programs and attract more attention, producers are embellishing their programs with customized graphics. The current state of production switchers relies on the technical director to make certain the correct graphic is applied as the director calls for background source changes. It is often not possible to change graphics and the background material at the same time given the switcher's resources, the time the technical director has to respond to requests from the director and the number of buttons the technical director can press at one time.

What is desired is a mechanism that makes selection of graphics more automatic, allowing the technical director to respond more rapidly to a director's call for source changes.

BRIEF SUMMARY OF THE INVENTION

Accordingly the present invention provides linking keyers to background source selections so that the selection of graphics is more automatic when background sources are changed. A key link association table is defined between background sources and keyers in an M/E of a production switcher. Key Add and Key Drop modifiers are provided so that the effect of the key link association table may be modified on demand when making a background source change.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a table view illustrating key link associations according to the present invention.

FIG. 2 is a plan view of a switcher panel layout which supports linking keyers to background source selections according to the present invention.

DETAILED DESCRIPTION OF THE INVENTION

A mechanism that makes selection of graphics more automatic involves defining a relationship between a background source, such as specific camera or satellite feeds, and one or more graphic elements, such as a news anchor's name or a "live" bug. These relationships are made for every background source with a known graphic element.

Once these relationships have been defined, the switcher is placed in an operating mode that selects the graphic elements on a keys bus of a mix/effects device (M/E) when the background source is changed. In the example above, when the studio camera is selected, the news anchor's graphic is selected on one of the M/E's keyers. When the satellite feed is selected as the background, the "live" bug is selected on the same keyer. The technical director may switch between the two sources without thinking about which graphic should be applied.

This mechanism also produces a cleaner transition since the selection of the key source is precisely synchronized with the background change. If this were done manually, the key might change a field before or after the background since the operator is pressing two different buttons on a switcher control panel.

Another part of the mechanism is a way for the technical director to decide at the last minute whether or not the key change should occur. This is accomplished by holding one of two buttons while making the background source change. Key Add instructs the switcher to add the associated key(s) over the background and to change the key source when the background change occurs. This is useful if the key is currently off air and the technical director wishes the graphic to go on air when the background changes. Key Drop instructs the system to take the key(s) off air when the background selection is made. This is useful if the technical director wishes the next source to go on air without the associated key(s). These "source selection modifiers" are designed to parallel the way the director gives instructions to the technical director, and may be used without considering the current state of the switcher or how the linked key relationships are defined. For example if the director says "take camera 3 clean", the technical director can hold Key Drop while selecting camera 3 and know that any linked keys are taken off air (or remain off air if they are not currently on). If the director says "take Satellite 4 with bug", the technical director may hold the Key Add while selecting Satellite 4 and know that the live bug is selected and the key turned on.

The programming process involves using menu screens to fill out a table of information. An excerpt from a switcher Functional Definition Documentation (FDD) that defines the switcher's user interface is described below which describes this process:

Key Linking

Key Add and Key Drop are an enhancement to a prior art switcher's down stream keyer (DSK) drop function. A background selection (A bus) determines which keys are visible on the M/E output. Selecting an A bus source turns on or off all linked keys as defined for each source. If a key source also is defined, the source feeding the keyer also changes. The Key Drop source select modifier forces linked keys off when a source selection is made on the A bus.

Key Add forces all linked keyers "on" when the source is selected. The user defines which keyers change state as a result of the background selection and which remain unchanged. A linked keyer changes state, an unlinked one does not. Whether the key is visible or invisible for those linked keys as well as a new keyer source also may be specified. The association is made through a key link menu.

Linking a keeper to an A bus source involves:

Indicating if the keyer is linked to the source or operates independently.

Identifying the default action (modified by the Key Add or Key Drop buttons); if the keyer should be cut on, cut off or remain in its current state.

Identifying a source to be selected on the keyer bus (or no change).

FIG. 1 shows a table that illustrates the key link associations. Pressing source 1 on the M/E's A row causes:

Keyer 1 is cut on, but the source does not change. Whatever is selected on the key 1 bus goes on air.

Keyer 2 is not linked and is unaffected by the selection.

Keyer 3's source is changed to source 12 and the keyer is cut off if it is currently on. This behavior is desirable if the show's formula is to cut to the news anchor without the lower third graphic, but to add it on soon after.

Keyer 4 is not linked and is unaffected by the selection. Pressing source 2 on the M/F's A row causes:

All keyers are cut off, but the source does not change. Pressing source 3 on the M/E's A row causes:

Keyer 1's source is changed to 13, but the keyer remains in its current state.

All other keyers are not linked and are unaffected by the selection. Pressing source 4 on the M/E's A row causes:

Keyer 1 is cut on and its source is changed to 12.

Keyer 2 is cut on and its source is changed to 27.

Keyer 3 is cut on and its source is changed to 34.

Keyer 4 is cut on, but its source does not change.

The Key Add and Key Drop modifiers modify, this user defined default behavior to allow the technical director to respond to the director's requests more easily.

Holding Key Add causes any linked keys to be cut on regardless of the user defined action for that key. In the Table of FIG. 1 selecting source 2 normally cuts key 1 off but holding Key Add cuts the key on instead. Holding Key Drop causes any linked keys to be cut off. Any key that has not been linked to an A bus source is not affected by Key Add or Key Drop. Which keyers are linked depends on the source to be selected on the A row. For example in the Table keyer 2 is linked for sources 2 and 4 but not for sources 1 and 3.

A selection in the keyer link menu enables keyer linking so that the operator mag disable it rapidly. A double press to open of Key Add or Key Drop is a method for accessing the key link menu. Programming key links is accomplished through an interaction between this menu and the main panel buttons. The operator first identifies the M/E to be examined or edited. The operator may scroll or page through the Table manually. Touching the master source selects it on the A row. This allows access to sources that are not mapped to the source select buttons. If links exist for a source and key linking is enabled, selecting it on the A row performs the key link in the normal manner. This permits key links to be tested easily.

As the operator makes key source selections or on/off changes to a keyer, that key becomes linked and the action and "slave" source are updated. Changing the key source defines the "slave" key source. Cutting the key on sets the action to ON, cutting if off sets the action to OFF. Alternatively links, actions and key sources may be set by touching the appropriate area of the menu. A pop-up choice list appears from which the operator may make a selection. Unlinking or setting slave source or action is done via the menu. Menu selections also are available to clear all key links for the current source, or to clear all links for the current M/E. A confirmation is required for the "all links on the M/E" case where there is no undo available.

Changes are immediate, but where an undo is available the UNDO restores the last source modified to its state before any modifications were made. The operator enables key link editing in the menu before making any changes, but may examine the current settings even with key link editing disabled. Once editing has been completed, key link editing is disabled to prevent further changes from being made through normal operation. Exiting the menu disables editing.

Selections on the A row of an M/E control that link "master source" are modified. The key link menu also allows key linking to be turned on and off for each M/E without modifying every entry in the Table.

FIG. 2 shows a panel layout that supports the key add/drop mechanism. The end of the source selector rows 12, the key add/drop modifiers 14/16 as well as other source select modifiers, and the transition controls 18 are shown. The source select buttons and key add/drop modifiers are pertinent to the present invention, the other components being shown for reference only.

Thus the present invention provides a mechanism for linking keyers to background source selections by establishing a key link association table for default changes, arid providing key add/drop modifiers to change the key linking as different changes are desired.

What is claimed is:

1. A method of linking keyers to background source selections in a production switcher comprising the steps of:

defining a key link association table between background sources and keyers for a mix effects bank of the production switcher; and modifying on demand the effects of the key link association table when making a background source change.

* * * * *